United States Patent
Moireau et al.

(10) Patent No.: US 11,534,942 B2
(45) Date of Patent: Dec. 27, 2022

(54) POSTPONED DIFFERENTIATION OF REINFORCED COMPOSITES

(71) Applicant: Owens Corning Intellectual Capital, LLC, Toledo, OH (US)

(72) Inventors: Patrick Moireau, Curienne (FR); Francois Roederer, Chambery (FR); Jean-Louis Viana, Cruet (FR)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 142 days.

(21) Appl. No.: 15/115,981

(22) PCT Filed: Feb. 4, 2015

(86) PCT No.: PCT/US2015/014350
§ 371 (c)(1),
(2) Date: Aug. 2, 2016

(87) PCT Pub. No.: WO2015/119984
PCT Pub. Date: Aug. 13, 2015

(65) Prior Publication Data
US 2017/0008195 A1    Jan. 12, 2017

Related U.S. Application Data

(60) Provisional application No. 61/936,388, filed on Feb. 6, 2014.

(51) Int. Cl.
*B29B 15/12* (2006.01)
*C03C 25/1095* (2018.01)
(Continued)

(52) U.S. Cl.
CPC .......... *B29B 15/122* (2013.01); *B29B 11/16* (2013.01); *C03C 25/1095* (2013.01);
(Continued)

(58) Field of Classification Search
CPC ... B29B 15/122; B29B 11/16; C03C 25/1095; C03C 25/328; C03C 25/48; C03C 25/6293
(Continued)

(56) References Cited

U.S. PATENT DOCUMENTS 3,863,758 A    2/1975  Connelly
4,277,531 A    7/1981  Picone
(Continued)

FOREIGN PATENT DOCUMENTS

CN    87104425    4/1988
CN    1228050     9/1999
(Continued)

OTHER PUBLICATIONS

Machine translation of h07-329059 (Year: 1995).*
(Continued)

*Primary Examiner* — Vincent Tatesure
(74) *Attorney, Agent, or Firm* — Calfee, Halter & Griswold LLP

(57) ABSTRACT

A reinforced composite is provided that includes at least one planar fiber reinforcement or fabric formed from a plurality of fibers. The fiber reinforcement or fabric has a first side and a second side. The reinforced composite further includes a chemical treatment coated on at least one of said first side and second side and a matrix material.

9 Claims, 5 Drawing Sheets

|  | Composite A | Composite B | Composite C |
|---|---|---|---|
| Treatment | No | No | polyetheramine 2.5% |
| Strength Warp (Mpa) | 102 | 268 | 117 |
| Strength Weft (Mpa) | 133 | 346 | 197 |
| Modulus Warp (Mpa) | 5082 | 13039 | 6805 |
| Modulus Weft (Mpa) | 6840 | 12602 | 11472 |
| Elongation Warp (%) | 4.2 | 2.9 | 3.2 |
| Elongation Weft (%) | 3.9 | 4.3 | 3.3 |

(51) Int. Cl.
    *C03C 25/328*     (2018.01)
    *C03C 25/48*     (2006.01)
    *C03C 25/6293*     (2018.01)
    *C08J 5/08*     (2006.01)
    *C03C 25/25*     (2018.01)
    *C08J 5/04*     (2006.01)
    *B29B 11/16*     (2006.01)
    *B29K 77/00*     (2006.01)
    *B29K 309/08*     (2006.01)

(52) U.S. Cl.
    CPC ............ *C03C 25/25* (2018.01); *C03C 25/328* (2013.01); *C03C 25/48* (2013.01); *C03C 25/6293* (2013.01); *C08J 5/04* (2013.01); *C08J 5/043* (2013.01); *C08J 5/08* (2013.01); *B29K 2077/00* (2013.01); *B29K 2309/08* (2013.01); *C08J 2300/24* (2013.01); *C08J 2377/00* (2013.01)

(58) Field of Classification Search
    USPC .......................................................... 442/71
    See application file for complete search history.

(56) References Cited

U.S. PATENT DOCUMENTS

| | | | |
|---|---|---|---|
| 4,469,543 | A | 9/1984 | Segal et al. |
| 4,810,576 | A | 3/1989 | Gaa et al. |
| 5,045,367 | A | 9/1991 | Bobsein et al. |
| 5,122,420 | A | 6/1992 | Baron et al. |
| 5,187,018 | A | 2/1993 | Glemet |
| 5,380,477 | A | 1/1995 | Kent et al. |
| 5,741,384 | A | 4/1998 | Pfeiffer et al. |
| 5,804,313 | A | 9/1998 | Schell |
| 5,824,413 | A | 10/1998 | Schell |
| 6,638,883 | B2 | 10/2003 | Gaffney et al. |
| 8,318,264 | B2 | 11/2012 | Moireau et al. |
| 8,927,662 | B2 | 1/2015 | McGrail et al. |
| 2001/0047050 | A1 | 11/2001 | Oyamada et al. |
| 2002/0005263 | A1 | 1/2002 | Smith, Jr. |
| 2002/0086598 | A1* | 7/2002 | Velpari ................ H05K 1/0366 442/74 |
| 2002/0119719 | A1 | 8/2002 | Edwards et al. |
| 2005/0163998 | A1* | 7/2005 | Kashikar ................ C03C 13/00 428/375 |
| 2005/0255773 | A1 | 11/2005 | Klang et al. |
| 2008/0299852 | A1 | 12/2008 | Lee et al. |

FOREIGN PATENT DOCUMENTS

| | | |
|---|---|---|
| CN | 101558020 | 10/2009 |
| CN | 102498153 | 6/2012 |
| DE | 19738388 | 2/1998 |
| DE | 19932274 | 1/2001 |
| FR | 2899224 | 10/2007 |
| GB | 1094439 | 12/1967 |
| GB | 1096103 | 12/1967 |
| GB | 1277756 | 6/1972 |
| JP | H07299875 A | 11/1995 |
| JP | H07329059 A * | 12/1995 |
| JP | 2002047412 A | 2/2002 |
| JP | 3338124 | 10/2002 |
| WO | 00/00351 | 1/2000 |
| WO | 02/42376 A1 | 5/2002 |
| WO | 02/065670 | 8/2002 |
| WO | 03/076499 A1 | 9/2003 |
| WO | 06/026734 | 3/2006 |
| WO | 2008073503 A1 | 6/2008 |

OTHER PUBLICATIONS

International Search Report and Written Opinion from PCT/US15/014350 dated Oct. 5, 2015.
Office action from Chinese Application No. 201580012649.8 dated Feb. 6, 2018.
Office Action from Japanese Patent Application No. 2016-0550497 dated Dec. 13, 2018.
Office Action from Chinese Patent Application No. 201580012649.8 dated Jan. 2, 2019.
Office Action from Russian Patent Application No. 2016134942 dated Aug. 2, 2018.
Office Action from European Patent Application No. 15706573.1 dated Feb. 14, 2019.
Office Action from Chinese Patent Application No. 201580012649.8 dated Jun. 27, 2019.
Office Action from Japanese Patent Application No. 2016-550497 dated Oct. 24, 2019.
Office Action from Chinese Patent Application No. 201580012649.8 dated Nov. 7, 2019.
General Chemical Technology of Organics vol. II, B.M. Bogoslovski et al., Chemical Industry Press, 1st Edition, Sep. 30, 1959, pp. 417-419. [Summary included in Office Action from Chinese Patent Application No. 201580012649.8 dated Nov. 7, 2019].
Office Action from Indian Patent Application No. 201637026954 dated Dec. 16, 2019.
Office Action from Brazilian Patent Application No. BR112016018093-3 dated Dec. 17, 2019.
Office Action from European Application No. 15706573.1 dated Feb. 19, 2020.
Office Action from Korean Patent Application No. 10-2016-7024618 dated Dec. 14, 2020.
Office Action from BR Patent Application No. BR112016018093-3 dated Apr. 30, 2021.
Examiner's Report from CA Application No. 2,938,874 dated Mar. 11, 2021.

* cited by examiner

|  | Composite A | Composite B | Composite C |
|---|---|---|---|
| Treatment | No | No | polyetheramine 2.5% |
| Strength Warp (Mpa) | 102 | 268 | 117 |
| Strength Weft (Mpa) | 133 | 346 | 197 |
| Modulus Warp (Mpa) | 5082 | 13039 | 6805 |
| Modulus Weft (Mpa) | 6840 | 12602 | 11472 |
| Elongation Warp (%) | 4.2 | 2.9 | 3.2 |
| Elongation Weft (%) | 3.9 | 4.3 | 3.3 |

FIGURE 1

Liquid Coating Compositions

| COMPOSTIONS | Formula 1 | Formula 2 | Formula 3 | Formula 4 | Formula 5 |
|---|---|---|---|---|---|
| Carbomonocyclic alkylated mixture of poly-aza-alkanes, hydrogenated | 60,00% | | | | 60,00% |
| 4, 4'-methylenebis-(cyclohexylamine) | 34,0% | | 22,7% | | |
| 2,4,6-Tris(dimethylaminomethyl)phenol | 6,0% | 5,0% | 5,0% | | |
| Mixture of polyamidoamine and triethylene tetramine | | 50,00% | | 40,00% | |
| aminopropyl-vinyl Ether | | 20,0% | 18% | | |
| Triethyleneglycol diamine | | 25% | | 30,0% | |
| poly-butadiene-diamine | | | 54,50% | | |
| benzyldimethylamine | | | | 5,0% | |
| Poly(oxypropylene)triamine | | | | 25% | |
| N-Vinyl-Pyrrolidone | | | | | 20,0% |
| Methyl Polymer with oxirane, bis(2aminopropyl)ether | | | | | 20,0% |
| Stability: | ok | ok | ok | ok | ok |
| Viscosity MPas (Brookfield spindle 2) | 232,5 | 70 | 115 | 102,5 | 62,5 |
| Color | slightly yellow | dark yellow | amber | slighly yellow | slightly yellow |
| Aspect | clear | clear | clear | clear | clear |

FIGURE 3

| | | LAMINATE EXAMPLES | | | | | | | | | |
|---|---|---|---|---|---|---|---|---|---|---|---|
| | | Fabric | | | | | | | | | |
| | | | | | | | Bending ISO 14125 dir L | | | | |
| Laminate reference | Laminate treatment | Sizing | Count (Tex) | Real Glass content (w%) | Calc. vol. Glass content (v%) | GF% for nor-maliz. (v%) | Stress (Mpa) | Stress standard deviation (Mpa) | Normalized Stress (Mpa) | Modulus (Mpa) | Modulus standard deviation (Mpa) | Normalized Modulus (Mpa) |
| 50 | no treatment | SE1500 | 1200 | 70.2 | 50.41 | 47 | 327,6 | 41,8 | 305 | 16237 | 818 | 15139 |
| 51 | Maleic anhydride (0.70%) | SE1500 | 1200 | 66.99 | 46,87 | 47 | 610,7 | 33,6 | 612 | 17910 | 699 | 17960 |
| 52 | Maleic anhydride (2.34%) | SE1500 | 1200 | 68.63 | 48,74 | 47 | 647,4 | 64,6 | 624 | 17803 | 1183 | 17167 |
| 53 | no treatment | PPG4510 | 1200 | 65.1 | 44,77 | 47 | 545,1 | 53,7 | 572 | 16458 | 834 | 17278 |
| 54 | PA6 (6.3%) | PPG4510 | 1200 | 66.71 | 46,36 | 47 | 655,4 | 35,8 | 664 | 19895 | 873 | 20170 |
| 55 | no treatment | SE4002-5 | 1200 | 71.11 | 51,54 | 47 | 618,9 | 54,5 | 564 | 17551 | 786 | 16005 |
| 56 | SMA 1000P + Jeffamine EDR 148 (0.81%) | SE4002-5 | 1200 | 67.75 | 49,1 | 47 | 748,1 | 50,5 | 716 | 19198 | 1419 | 18376 |

FIGURE 5

POSTPONED DIFFERENTIATION OF REINFORCED COMPOSITES

RELATED APPLICATIONS

The present application is the U.S. national stage entry of PCT/US15/14350, filed on Feb. 4, 2015, which claims priority to U.S. provisional application No. 61/936,388, filed on Feb. 6, 2014, both of which are hereby incorporated by reference in their entirety.

The present invention relates to a method for treating reinforcement materials for compatibility with matrices for which the reinforcement materials were not originally designed.

BACKGROUND

Reinforcement fabrics manufactured from reinforcing materials such as glass or carbon fibers, are commonly known in the art. Such fabrics are traditionally used in composite products, such as printed circuit boards, skis, rail car tanks, boat hulls, and the like. Yarns of glass, carbon, and/or graphite are typically formed into fabrics. A plurality of layers of fabric are stacked and cut into dry fabric preforms. The preform is then placed in a mold and injected with a suitable matrix material to make a reinforced polymer composite.

Reinforcement fibers undergo various treatments in order to promote compatibility with the particular matrix material being used in a polymer composite. If proper compatibility between the reinforcement fiber and the polymer is not achieved, the composite will possess a relatively heterogeneous structure, which necessarily leads to a deterioration of the mechanical properties of the end product. Therefore, a sizing composition may be applied to the fibers in the forming operation, wherein the sizing composition contains one or more components (lubricants, binders, or coupling agents) designed to protect the fibers and/or promote compatibility with a desired matrix material.

Accordingly, sizing compositions are often specifically designed for compatibility with a particular matrix material or family of materials (e.g., polyamide, polypropylene, epoxy, UP). Such customized sizing compositions lead to a wide variation in sizing compositions and a consequent complexity in the plant and supply chain organization.

It would be beneficial to simplify the reinforced polymer composite chain with a reduced number of sizing compositions that allow for the use of a wide range of components without changing the manufacturing process or adding new sizing compositions.

SUMMARY

Various exemplary embodiments of the present invention are directed to a reinforced composite. The reinforced composite includes at least one fiber reinforcement or fabric having a first side and a second side, a chemical treatment coated on at least one of the first side and second side of the fiber reinforcement or fabric, and a matrix material.

In some exemplary embodiments, the fibers are coated with a sizing composition that may not be compatible with the matrix material.

In some exemplary embodiments, the matrix material comprises at least one of a thermoset material, a thermoplastic material, and a combination thereof.

In some exemplary embodiments, the chemical treatment includes one or more of a surfactant, a low melting point polyamide, a reactive compound, and a plasma. The chemical treatment may increase the compatibility between the sizing composition and the matrix material.

In some exemplary embodiments, the chemical treatment is coated in an amount from about 0.05 to about 20 weight percent of the glass fibers.

Various exemplary embodiments of the present invention are further directed to a method for forming a reinforced composite. The method includes forming a fiber reinforcement or fabric having a first side and a second side, coating at least one of the first side and second side of the fiber reinforcement or fabric with a chemical treatment, and impregnating the coated fiber reinforcement with a matrix material.

In some exemplary embodiments, the fibers are coated with a sizing composition that may not be compatible with the matrix material.

In some exemplary embodiments, the matrix material comprises at least one of a thermoset material, a thermoplastic material, and a combination thereof.

In some exemplary embodiments, the chemical treatment includes one or more of a surfactant, a low melting point polyamide, a reactive compound, and a plasma. The chemical treatment may increase the compatibility between the sizing composition and the matrix material.

In some exemplary embodiments, the chemical treatment is coated in an amount from about 0.05 to about 20 weight percent of the glass fibers.

BRIEF DESCRIPTION OF DRAWINGS

FIG. 1 illustrates mechanical properties demonstrated by three different thermoplastic fabric-reinforced composites.

FIG. 3 illustrates exemplary chemical treatment compositions that may be used in accordance with the present invention.

FIG. 5 illustrates exemplary laminates formed to further demonstrate the effects of chemically treating a fabric compared to not treating the fabric.

DETAILED DESCRIPTION

Figure 2:
FIG. 2 illustrates exemplary fabric-reinforced laminates reinforced by three 600 g/m² fabric plies.

While various exemplary embodiments are described or suggested herein, other exemplary embodiments utilizing a variety of methods and materials similar or equivalent to those described or suggested herein are encompassed by the general inventive concepts.

Unless defined otherwise, all technical and scientific terms used herein have the same meaning as commonly understood by one of ordinary skill in the art to which the invention belongs. In this connection, unless otherwise indicated, concentrations of ingredients given in this document refer to the concentrations of these ingredients in the master batch or concentrate, in keeping with customary practice.

As used herein, the terms "sizing composition" or "sizing" are used interchangeably and refer collectively to compositions used in the manufacture of fibers as a coating to protect the integrity of fibers, provide enhanced interfacial interactions between a fiber and a matrix material in a composite, and/or alter and/or enhance particular properties of the fibers.

In accordance with customary practice, the term "fiber" or "fiber material" refers to any material which has a fibrous structure as its elemental structural component. The terms encompass fibers, filaments, yarns, tows, tapes, woven and non-woven fabrics, plies, mats, and the like.

As used herein, the phrase "postponed differentiation" is used to describe a process that starts by making a generic fiber reinforcement material that is later differentiated into a specific fiber reinforcement material to be used to reinforce a specific matrix (or composite). The process uses a chemical treatment that is used to increase the compatibility between a sizing composition and a matrix material.

The general inventive concepts relate to a method for delaying the differentiation of reinforcement materials by expanding the compatibility of the reinforcement materials to a variety of matrices, rather than a single type of material. For example, reinforcement materials, such as fibers, designed for use in thermoset applications may be treated in accordance with the present invention, for compatibility in a thermoplastic matrix. By postponing the differentiation of materials based on compatibility the forming process may become more standardized, which leads to reduced costs and improved mechanical performance.

In some exemplary embodiments, the reinforcement materials include any of glass fibers, carbon fibers, mineral fibers, ceramic fibers, natural fibers, and/or synthetic fibers. The glass fibers can be made from any type of glass. Examples of glass fibers include A-type glass fibers, C-type glass fibers, E-type glass fibers, S-type glass fibers, ECR-type glass fibers (e.g., Advantex® glass fibers commercially available from Owens Corning), Hiper-tex™ glass fibers, wool glass fibers, and combinations thereof. The term "natural fiber" as used in conjunction with the present invention refers to plant fibers extracted from any part of a plant, including, but not limited to, the stem, seeds, leaves, roots, or phloem. Examples of natural fibers which may be suitable for use as the reinforcing fiber material include basalt, cotton, jute, bamboo, ramie, bagasse, hemp, coir, linen, kenaf, sisal, flax, henequen, and combinations thereof. The term "synthetic fiber," as used herein is meant to indicate any man-made fiber having suitable reinforcing characteristics, such as polyester, polyethylene, polyethylene terephthalate, polypropylene, polyamide, aramid, and polyaramid fibers, as well as combinations thereof. Although the following description is directed to the use of glass fibers, it should be understood that any of the above-referenced fiber reinforcement materials may be used.

The glass fibers may be formed by conventional methods known to those skilled in the art. For example, the glass fibers may be formed by a continuous manufacturing process in which molten glass passes through the holes of a "bushing," the streams of molten glass thereby formed are solidified into filaments, and the filaments are combined together to form a "fiber," "roving," "strand," or the like.

After the glass fibers are drawn from the bushing, a sizing composition may optionally be applied to the fibers. The sizing composition is not limited, and may be any sizing composition known to those of skill in the art. Generally sizing compositions contain a lubricant to protect the fibers from damage by abrasion, a film-forming resin to help bond the fibers to the polymer forming the body or matrix of the composite in which the fibers will be used, and a coupling agent to improve the adhesion of the film-forming resin to the surfaces of the glass fibers. The sizing composition may be applied by conventional methods such as by an application roller or by spraying the sizing directly onto the fibers. The sizing protects the glass fibers from breakage during subsequent processing, helps to retard interfilament abrasion, ensures the integrity of the strands of glass fibers, promotes the interconnection of the glass filaments that form the strand, etc.

In an exemplary reinforced composite according to the invention, the glass reinforcement is preferably chosen from glass wovens; nonwovens of complex type; veils; mats; glass scrims, especially for a building application; unitary strands sized or converted beforehand; and compound strands.

In some exemplary embodiments, the glass reinforcements are yarns that may be weaved to form a reinforcing fabric. The reinforcing fabric may then be impregnated with a matrix material to form the reinforced composite. In order to produce a high strength composite, it is important that the reinforcing fabric is compatible with the matrix material. Therefore, chemical treatment compositions are typically designed for compatibility with the particular matrix material that will be subsequently applied to the sized fiber or formed fabric. The sizing composition serves to improve the bonding relationship between the glass fibers and the thermoset or thermoplastic matrix material.

The thermoplastic matrix material may include, for example, acrylonitrile butadiene styrene (ABS), polycarbonate (PC), polycarbonate/acrylonitrile butadiene styrene (PC/ABS), polysulfones, polyamides (PA), polyacrylic, polyethylene (PE), polycarbonates, polyphenylene oxides, polysulfides, polyether ether ketones (PEEK), poly ether ketone (PEK), polyphenylene sulfide (PPS), polyurethane (PU), polystyrene, polyether sulfones, polyamide-imides, polyetherimides, polyimides, polyarylates, polyphthalamide, acrylic styrene acrylonitrile, polyphenylene ether, polyolefins, polyester, rubber (SBR), butadiene nitrile rubber (BNR), ethylene propylene diene monomer rubber (EPDM), fluoropolymer (FP), liquid crystalline polyester, and other thermoplastics and alloys of thermoplastics.

The thermoset matrix material may include, for example, epoxies, urea-formaldehyde (UF), polyesters (UP), phenolics, polyimides, silicone, and the like.

In some exemplary embodiments, the reinforcement materials include continuous glass fibers that have been coated with sizing compositions designed to be compatible with thermoset materials. In some exemplary embodiments, the sizing composition may include OC® SE 1200 or OC® SE 1500. OC® SE 1500 is not typically recommended for use with any resins other than epoxy resins. OC® SE 1200 is designed for use with epoxy, polyesters and vinyl ester matrices. Since sizing compositions such as OC® SE 1500 and OC® SE 1200 are designed mainly for use with a thermoset matrix material, they lack adequate chemical properties to generate good compatibility and/or good chemical reactivity with thermoplastic matrix materials, such as polyamide.

Although the following description refers specifically to sizing compositions designed for use with thermoset matrix materials, particularly OC® SE 1500 and OC® SE 1200, it should be understood that any sizing composition may alternatively be used. Additionally, although the below description will refer to thermoplastic matrices, particularly polyamide, it should be understood that any matrix material may alternatively be used.

In accordance with some exemplary embodiments, reinforced composites are produced by utilizing postponed differentiated reinforcements by a chemical treatment process. Such postponed differentiation improves the compatibility and reactivity of the glass fibers with a broader range of matrix materials, as compared to glass fibers that were originally coated with sizing compositions dedicated for use with only one type of matrix material. Additionally, it has been discovered that such chemical and/or physical treatment processes result in fabric reinforced composites with improved mechanical and/or physical properties.

In other exemplary embodiments, chemical treatments are provided for use with fibers and fabrics sized with a sizing composition specifically designed for a particular matrix. The chemical treatment is able to improve the mechanical properties by at least 15% over conventional composites that include fibers and/or fabrics coated with sizing compositions, but not chemically treated.

Chemical Treatments

In some exemplary embodiments, the modification includes chemically treating the surface of glass fibers to improve the compatibility between a sizing composition and matrix material. Such a chemical treatment is dependent on the nature of the sizing composition and the matrix material. For example, the chemical treatment may include a compatibilizer between epoxy and polyamide.

The chemical treatment may be applied to the fibers at any time during the formation of a fabric reinforced composite. For instance, the chemical treatment may be applied as a post-sizing treatment step, as a treatment applied to any fabric or other reinforcement material formed with the fibers, or it may be applied during impregnation with a matrix material. The chemical treatment may be in the form of a liquid, such that it is deposited via a rolling, spraying, dipping, or the like, or it may be in the form of a powder, such that it is applied via a powder spray gun, powder deposition tool, and the like. The chemical treatment may also be in the form of plasma, wherein a fabric or other reinforcement material passes through a plasma chamber where the chemical treatment is deposited.

In some exemplary embodiments, the chemical treatment is applied in an amount from about 0.05 to about 20 weight percent of the glass fibers, including about 0.1 to about 10 weight percent, including about 0.1 to about 5 weight percent, including about 0.5 to about 2 weight percent, and including about 1.0 to about 1.5 weight percent of the glass fibers.

Wetting Agents

In some exemplary embodiments, the chemical treatment includes applying one or more wetting agents to the fibers or fabric to improve compatibility between the forming polymer(s) contained in the sizing composition and the matrix material. In some exemplary embodiments, the wetting agent is a surfactant. The application of a surfactant may improve the wetting out of a fabric by modifying the surface tension on each side of the fabric. The surfactant may be any surfactant that is stable at high consolidation temperatures, such as between about 250° C. to about 400° C., without decomposition, oxidation, vaporization, etc. To withstand such conditions, the surfactant may include heteroatoms, such as halogens, phosphorous, silicon, boron, and the like. Halogens improve the stability of the surfactants by increasing the boiling point of the chemical treatment. As the heteroatoms are added by substitution to hydrogen, they limit the action of oxidants by stronger covalent bonds and steric hindering, since heteroatoms like chlorine, for example, are much bigger than hydrogen. Exemplary surfactants include fluorinated or chlorinated fatty alcohols (eventually alkoxylated), alkyl phosphates or phosphonates (eventually halogenated), alkylpolysiloxanes (eventually halogenated), and fluoro or chloro alkane sulfonates or sulfates.

Low Melting Point Polyamide

In some exemplary embodiments, the chemical treatment includes one or more low melting point polyamides. The polyamide may be one that exhibits a low melting point and high fluidity after melting. In some exemplary embodiments, the polyamide has a melting point that is less than 250° C., or less than about 230° C. The low melting point allows the polyamide to remain in the liquid state before the matrix polymer reaches its own melting point. In some exemplary embodiments, the polyamide chemical treatment is compatible with the matrix polymer and acts as a high temperature solvent to partially solubilize the matrix. Particularly, when the matrix material is a polyamide, the polyamide chemical treatment may have the same polymer nature and chemical functions. Partial solubilization of the matrix material may decrease the final melting point of the matrix material and increase its fluidity. Such an increased fluidity may also improve the matrix polymer's impregnation capability. In some exemplary embodiments, the low melting point polyamide is PA6 or PA12.

Reactive Compounds

In some exemplary embodiments, the chemical treatment comprises one or more reactive compounds that have reactive functionality with both the sizing composition and the matrix material and are capable of covalently bonding the sizing composition to the matrix material. The covalent bonding generates significantly higher mechanical and chemical resistance for the final composite.

The reactive compound may include one or more reactive primary amines or amides. Reactive primary amines and/or amides are reactive with polyamide as well as with other epoxies and act as cross-linking agents in composites or polymer synthesis. The reactive amines or amides may include, for example, one or more of polyamidoamine, polyamine, 4,4'-methylenebis-(cyclohexylamine), polyoxypropylene diamine, triethyleneglycol diamine, trimethylopropane-polyoxypropylene triamine, bis(2-aminopropyl) ether, aminopropylvinyl ether, polybutadiene diamine, and the like.

In some exemplary embodiments, the reactive compounds have simultaneously complementary actions, such that the compounds possess one or more of the reactive, wetting agent, and low melting point functionalities described above. Such compounds include both a hydrophobic structure, imparting surfactant functionality, and a hydrophilic structure, imparting the reactive functionality. For example, polyoxypropylene diamine, trimethylolpropane polyoxypropylene triamine, and polybutadiene diamine behave like surfactants as they have a hydrophobic core structure and hydrophilic terminal reactive functions (amines).

In some exemplary embodiments, the reactive compound may include copolymers that react with both epoxies and free functional groups of the matrix material. For example, the reactive functional copolymer may include one or more of a diamine-diamide, or other polyamine-polyamide compound, with a maximum of 4 reactive functional groups; a styrene maleic anhydride (SMA); or a SMA modified imide. Such compounds have chemical reactivity with both epoxides in the sizing composition and a good compatibility with a polyamide matrix. The compounds act as chain extenders and improve fabric wetting. Additionally, the reactive functional copolymer may have a low melting point, such as in the range of about 100° C. to about 250° C. The low melting point may also work to solubilize the matrix material, decreasing the final melting point of the matrix material. Therefore, the copolymer with a lower melting point than the matrix itself may act as a "high temperature solvent" or "melting accelerator."

In some exemplary embodiments, any combination of one or more of the above described chemical treatments may be used. For instance, the polyamide chemical treatment may be used in combination with a reactive amino component in order to increase the chemical reactions with the epoxy groups. The combination of chemical treatments may be formulated using products of the same family or between products exhibiting different reactive functions, such as a combination of a styrene maleic anhydride (polyfunctional) and a diamine.

In various exemplary embodiments, the chemical treatment is a plasma. As disclosed in U.S. Pat. No. 8,318,264, fully incorporated by reference herein, glass reinforcements are surface treated with a homogenous plasma of a gas mixture, in a controlled gaseous atmosphere, for oxidation or nitration of the organic size present on the surface of the glass reinforcement. However, here, the target is to directly graft functional groups, such as amino groups, on a size glass fiber. Such an addition of functional groups will improve the reactivity of the sizing with the matrix material, such as polyamide. The amine is grafted on an epoxy-sized fiber using plasma deposition in a nitrogenous atmosphere to avoid reaction with $CO_2$.

Having introduced the general inventive concepts by disclosing various exemplary embodiments thereof, a further understanding can be obtained by reference to certain specific examples illustrated below which are provided for purposes of illustration only and are not intended to be all inclusive or otherwise limiting of the general inventive concepts.

EXAMPLES

In order to more thoroughly describe this invention, the following working examples are provided.

Example 1

FIG. 1 illustrates the mechanical properties demonstrated by three different thermoplastic fabric-reinforced composites. Composite A was formed using glass fibers sized with SE 1500, which is specifically designed for use with thermoset matrix materials. Composite B was formed using glass fibers sized with SE 4531, which is specifically designed for use with thermoplastic matrix materials. Finally, Composite C was formed using SE 1500-sized fibers that were also treated with a primary amine (polyetheramine) chemical treatment.

As illustrated in FIG. 1, the chemically treated fabric reinforced composite (Composite C) demonstrated physical properties superior to Composite A, which lacked any chemical treatment. Additionally, Composite C demonstrated comparable properties to Composite B, which was formed using a sizing composition specifically designed for use with a thermoplastic matrix material.

Example 2

Fabric-reinforced laminates were manufactured having a thickness of 1.5 mm reinforced by three 600 g/m² fabric plies. The laminates included a glass content of about 65-70 percent by weight of the laminates. The different fabric layers were compiled as illustrated in FIG. 2. Each laminate produced is listed in Table 1, including type of chemical treatment, percentage of chemical treatment based on the total weight percent of glass, and consolidation parameters. Two samples were prepared as comparative samples. The fabric of Sample 1 was sized with SE 1500 and untreated and the fabric of Sample 2 was sized with SE 4531 and untreated. In each sample, other than the comparative samples, the glass fibers were sized with OC® SE 1500. The fabric layers were coated on each side with various chemical treatments and consolidated with a polyamide matrix material. The consolidation of the laminate was made in a single treatment under a heating press and the laminate was then transferred under a cold press for cooling.

TABLE 1

| Sample | Chemical Treatment | %/glass | T (° C.) | P (bar) | Time (min) |
|---|---|---|---|---|---|
| | | | | Consolidation | |
| 1 | None | — | 290° | 5 | 5 |
| 2 | None | — | 290° | 5 | 5 |
| 3 | Polyoxypropylene diamine | 2% | 290° | 5 | 5 |
| 4 | Polyoxypropylene diamine | 1% | 290° | 20 | 5 |
| 5 | Polyoxypropylene diamine | 1% | 290° | 20 | 5 |
| 6 | Polyoxypropylene diamine | 2% | 290° | contact | 3 |
| 7 | Polyoxypropylene diamine | 2% | 290° | contact | 4 |
| 8 | Polyamidoamine | 1.50% | 290° | contact | 3 |
| 9 | Carbomonocyclic alkylated mixture of polyaza alkaned | 2% | 290° | contact | 3 |
| 10 | Mixture of polyamidoamine and polyamine | 2% | 290° | contact | 3 |
| 11 | Polyoxypropylene diamine | 2% | 290° | contact | 3 |
| 12 | Polyoxypropylene diamine | 10% | 290° | contact | 3 |
| 13 | Polyoxypropylene diamine | 2% | 290° | contact | 3 |
| 14 | Polyoxypropylene diamine | 1% | 290° | 20 | 3 |
| 15 | Styrene-maleic anhydride | 2% | 290° | 20 | 3 |
| 16 | Styrene-maleic anhydride | 2% | 290° | contact | 3 |
| 17 | Polyamide 6 | 20% | 290° | 20 | 3 |
| 18 | Polyamide 6 | 20% | 290° | 20 | 3 |
| 19 | Polyamide 6 | 10% | 290° | 20 | 3 |
| 20 | Polyamide 6 | 5% | 290° | 20 | 3 |
| 21 | Polyamide 6 | 2.5% | 290° | 20 | 3 |
| 22 | Polyamide 6 | 5% | 290° | 20 | 2 |
| 23 | Polyamide 6 | 5% | 290° | 10 | 2 |
| 24 | Styrene-maleic anhydride | 2% | 290° | 20 | 3 |
| 25 | Styrene-maleic anhydride | 4% | 290° | 20 | 3 |
| 26 | Styrene-maleic anhydride | 8% | 290° | 20 | 3 |
| 27 | Formula 1 (FIG. 3) | 2% | 290° | 20 | 2 |
| 28 | Formula 2 (FIG. 3) | 2% | 290° | 20 | 2-3 |
| 29 | Formula 3 (FIG. 3) | 2% | 290° | 20 | 2-3 |
| 30 | Formula 4 (FIG. 3) | 2% | 290° | 20 | 2-3 |
| 31 | Formula 5 (FIG. 3) | 2% | 290° | 20 | 2 |
| 32 | Polyamide 6 | 5% | 290° | 20 | 2-3 |
| 33 | Styrene-maleic anhydride | 2% | 290° | 20 | 2-3 |
| 34 | Styrene-maleic anhydride | 2% | 290° | 20 | 2-3 |
| 35 | Polyamide 6 | 10% | 290° | 20 | 2 |
| 36 | Polyamide 6 | 5% | 290° | 20 | 2 |

Appearance/Quality Results

The chemical treatments tested included low melting point polyamides, including both polyamide 6 and polyamide 12, in amounts from about 5 to about 15 weight percent based on the weight of the glass fibers. Both had a positive effect on the laminate's surface aspect meaning that the laminates demonstrated low porosity and low blister levels. It is believed that treatment with a polyamide enhances the softening speed of the matrix material and lowers its melting point. The chemical treatments further included amino functional and styrene-maleic anhydride copolymers, modified or not with reactive amino compounds. The styrene-maleic anhydride had a positive effect on the laminate's surface aspect and also was able to obtain good results in less consolidation time.

The results demonstrate that manufacturing process variables, such as consolidation pressure and time also affect the quality of the laminate produced. The results also indicate that a minimal pressure of 20 bars is important for obtaining a good desired surface aspect without too many blisters. At a lower pressure, the surface aspect begins to degrade and blisters develop.

Additionally, the results indicate that a minimum delay of 2 minutes allows sufficient time to transfer the temperature at 290° C. from the press plates to the laminate. Additional time delay may further lower the blister quantity, although it may increase the presence of a surface porosity.

Mechanical Results

Table 2, below, illustrates the mechanical properties of sample laminates (Samples 3, 4, 13, 18, 20, 25-26, 30, 32, 35 and 36) made with glass fibers sized with SE 1500, as compared to Samples 1 and 2 that did not include any chemical treatment. As shown in Table 2, each laminate that included a chemical treatment demonstrated increased strength and modulus, as compared to the laminates that did not include any chemical treatment. The chemically treated laminates additionally demonstrate reduced elongation in both the warp and weft direction, as compared to the untreated laminates.

Additionally, as described above, the chemical treatment polyamide 6 is multi-functional, in that it also induces a lower melting point of the matrix, and is able to significantly improve mechanical performance (Samples 32, 35, and 36 vs. Sample 1) even with short consolidation time (2 min). This performance was close to the mechanical performance of a product with a specific sizing for a polyamide matrix (Sample 2). Compositions inducing higher chemical bonding also generated significant improvement (Samples 25, 26, and 30 vs. Sample 1). A surface treatment to improve wetting properties between the sizing and the matrix may improve composite performance (Samples 13 vs. Sample 1). A mixture of amines (Sample 30) also represented an improvement in comparison with the reference Sample 1.

TABLE 2

| | | Composite | | | | | | | | | |
|---|---|---|---|---|---|---|---|---|---|---|---|
| | Glass | Strength (Traction-MPa) | | | | Modulus (MPa) | | | | Elongation (%) | |
| Sample | content % | Warp | SD | Weft | SD | Warp | SD | Weft | SD | Warp | Weft |
| 1 | 65.4 | 102.8 | 28.9 | 133.1 | 29.6 | 5082 | 1960 | 6840 | 1491 | 4.2 | 3.9 |
| 2 | 65.3 | 268.7 | 84.5 | 346.4 | 91.4 | 13039 | 3273 | 12602 | 3003 | 2.9 | 4.3 |
| 3 | 60.1 | 116.8 | 46.2 | 197.3 | 25.2 | 6805 | 3428 | 11472 | 1124 | 3.2 | 3.3 |
| 4 | 68.8 | 215.1 | 49.9 | 282.1 | 47.8 | 12297 | 1466 | 13904 | 967 | 2.8 | 4.1 |
| 13 | 68.7 | 221.3 | 41.8 | 280.9 | 28.1 | 12504 | 968 | 12325 | 1084 | 0.0 | 4.6 |
| 18 | 69.6 | 184.5 | 25.6 | 215.0 | 30.8 | 11984 | 2347 | 13987 | 1056 | 2.3 | 2.5 |
| 20 | 70.7 | 185.6 | 28.3 | 220.4 | 28.3 | 11639 | 1809 | 13310 | 409 | 2.1 | 2.2 |
| 25 | 69.0 | 210.8 | 20.8 | 222.8 | 42.0 | 12641 | 1087 | 13793 | 1343 | 2.7 | 2.9 |
| 26 | 67.2 | 148.9 | 19.4 | 181.9 | 38.2 | 10709 | 1357 | 14044 | 786 | 2.5 | 1.8 |
| 30 | 68.5 | 164.3 | 19.5 | 214.0 | 31.0 | 11906 | 945 | 13585 | 514 | 2.3 | 2.9 |
| 32 | 70.1 | 218.3 | 31.9 | 236.0 | 42.8 | 12969 | 1402 | 12970 | 2259 | 2.4 | 3.1 |
| 35 | 67.0 | 235.0 | 51.2 | 295.3 | 25.0 | 12908 | 1778 | 15078 | 701 | 2.3 | 2.6 |
| 36 | 67.4 | 222.0 | 50.5 | 266.6 | 37.3 | 13581 | 1658 | 13771 | 918 | 2.4 | 2.8 |

Example 3

Fabric laminates were produced using glass fibers sized with SE 4002, which is based on polyurethane polymer emulsions and amino coupling agents. SE 4002 is specifically designed for use with polyamide matrix materials. The fabrics were treated with four chemical treatments: a) 75% styrene-maleic anhydride ("SMA1000H") and 25% styrene-maleic anhydride ("SMA 3000I"); b) 66% styrene-maleic anhydride ("SMA1000P") and 33% primary diamine (EDR 600); c) polyamide 6; and d) polyamide 12. The fabric composites were formed using a polyamide 6 matrix material. The composites were compressed at a temperature of 290° C. at a pressure of 20 bars. Note: These composites were prepared according to two different processes:

1. The chemically treated fabrics of Samples a-d were impregnated with the polyamide matrix (fusion) for each ply for a total of 3 plies. The three plies were assembled and consolidated under high temperature and pressure to obtain the final composite.

2. The non treated fabrics (FIG. 4, Samples e and f) were powdered with a specific polyamide on each face and the powder was fixed by thermal treatment on each face. The modified fabric was impregnated with the polyamide matrix and the three plies were assembled and consolidated and high temperature and pressure.

Figure 4:
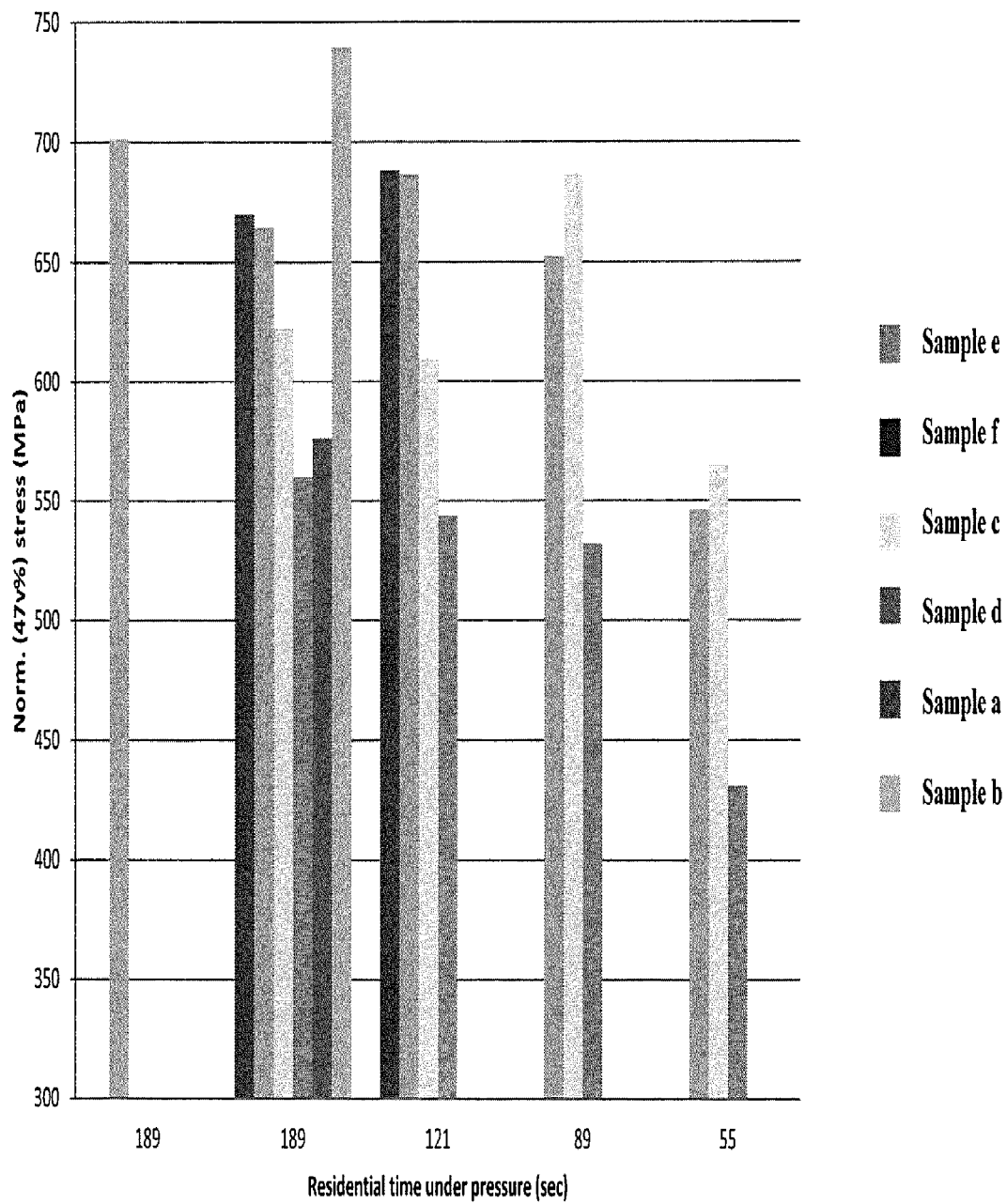
FIG. 4 illustrates the effect that the various chemical treatments have on bending stress, compared to two reference (untreated) rovings.

FIG. 4 illustrates the effect that the various chemical treatments have on bending stress compared to two reference rovings. As illustrated, the polyamide 6 treated fabrics resulted in a high stress value at a treatment time of about 89 seconds (accelerated melting) and at 55 seconds even if all the values are globally lower.

Example 4

FIG. 5 illustrates exemplary laminates formed to further demonstrate the effects of chemically treating a fabric compared to untreated fabric. Laminates were formed using a PA6 matrix material with three layers of fabric. The laminates were compressed at 290° C. at a pressure of 20 bar. Three sets of laminates were prepared, with each set including one laminate without any chemical treatment. The first set (Laminates 50-52) included glass fibers sized with SE 1500 (designed for use with thermoset matrix materials). Laminate 51 included fabric chemically treated with maleic anhydride at a quantity of 0.70% of the fabric weight and the fabric used in Laminate 52 was chemically treated with maleic anhydride at a quantity of 2.34% of the fabric weight. The second set (Laminates 53-54) included glass fiber fabric made with PPG roving product PPG 4510 (designed for use with thermoplastic polyamide matrix materials). Laminate 54 included fabric that was chemically treated with polyamide 6 at a quantity of 6.3% of the fabric weight. The third set (Laminates 55-56) included glass fiber fabrics made with Owens Corning roving product SE 4002-5 (designed for use with thermoplastic matrix materials). Laminate 56 included fabric that had been chemically treated with styrene maleic anhydride and an amine at a quantity of 0.81% of the fabric weight.

The flexural properties of each laminate are listed in FIG. 5. As illustrated, the treatments with maleic anhydride improved stress values and modulus properties over the untreated control. Such an improvement in properties can also be seen in the second and third set, which included glass fibers sized with a polyamide complementary sizing composition. The chemical treatment provided an additional improvement in both stress values and in modulus values.

The fabric treated with the SMA and primary amine (Laminate 56) demonstrated the highest stress value, even as compared to the control (Laminate 55) due to enhanced chemical bonding.

Although several exemplary embodiments of the present invention have been described herein, it should be appreciated that many modifications can be made without departing from the spirit and scope of the general inventive concepts. All such modifications are intended to be included within the scope of this invention and the related general inventive concepts, which are to be limited only by the following claims.

The invention claimed is:

1. A reinforced composite comprising:
at least one fabric formed from a plurality of fibers having a sizing composition and a single chemical treatment disposed thereon, wherein the sizing composition includes a film former and a coupling agent;
said chemical treatment being coated on a surface of the fabric, wherein the chemical treatment is present on the fabric in an amount from 1 weight percent to 20 weight percent and the chemical treatment consists of one or more of a polyamide having a melting point less than 250° C., a reactive compound selected from a primary amine, primary amide, styrene-maleic anhydride, and mixtures thereof; and
a thermoplastic matrix material, wherein the sizing composition is not compatible with the thermoplastic matrix material and the chemical treatment increases the compatibility between the sizing composition and the thermoplastic matrix material.

2. The reinforced composite of claim 1, wherein said fibers are continuous glass fibers.

3. The reinforced composite of claim 1, wherein said thermoplastic material comprises a polyamide.

4. The reinforced composite of claim 1, wherein chemical treatment consists of the reactive compound selected from a primary amine, primary amide, styrene-maleic anhydride, and mixtures thereof.

5. A laminate comprising:
a first fabric formed from a plurality of fibers having at least one fabric formed from a plurality of fibers having a sizing composition and a single first chemical treatment disposed thereon, wherein the first sizing composition includes a film former and a coupling agent, the first fabric having a first side and a second side;
said first chemical treatment being coated on the first side of the first fabric, wherein the first chemical treatment is present on the first fabric in an amount from 1 weight percent to 20 weight percent and the first chemical treatment consists of one or more of a first polyamide having a melting point less than 250° C., a first reactive compound selected from a primary amine, primary amide, styrene-maleic anhydride, and mixtures thereof;
a first thermoplastic matrix material coated on the first chemical treatment, wherein the first sizing composition is not compatible with said first thermoplastic matrix material and the first chemical treatment increases the compatibility between the first sizing composition and the first thermoplastic matrix material;
a second fabric formed from a plurality of fibers having a second sizing composition at least one fabric formed from a plurality of fibers having a sizing composition and a single second chemical treatment disposed thereon, wherein the second sizing composition includes a film former and a coupling agent, the second fabric having a first side and a second side, wherein the second side of the second fabric is laminated to the first thermoplastic matrix material;
said second chemical treatment being coated on the first side of the second fabric, wherein the second chemical treatment is present on the second fabric in an amount from 1 weight percent to 20 weight percent and the second chemical treatment consists of one or more of a second polyamide having a melting point less than 250° C., a second reactive compound selected from a primary amine, primary amide, styrene-maleic anhydride, and mixtures thereof; and
a second thermoplastic matrix material coated on the second chemical treatment, wherein the second sizing composition is not compatible with said second thermoplastic matrix material and the second chemical treatment increases the compatibility between the second sizing composition and the second thermoplastic matrix material.

6. The reinforced composite of claim 1, wherein the chemical treatment is selected from one or more of the group consisting of polyamidoamine, polyamine, 4,4'-methylenebis-(cyclohexylamine), polyoxypropylene diamine, triethyleneglycol diamine, trimethylopropane-polyoxypropylene triamine, bis(2-aminopropyl)ether, aminopropylvinyl ether, and polybutadiene diamine.

7. The laminate of claim 5, wherein the first chemical treatment and the second chemical treatment are each individually selected from one or more of the group consisting of polyamidoamine, polyamine, 4,4'-methylenebis-(cyclohexylamine), polyoxypropylene diamine, triethyleneglycol diamine, trimethylopropane-polyoxypropylene triamine, bis(2-aminopropyl)ether, aminopropylvinyl ether, and polybutadiene diamine.

8. A reinforced composite comprising:
at least one fabric formed from a plurality of fibers having a sizing composition and a single chemical treatment disposed thereon;
said chemical treatment being coated on a surface of the fabric, wherein the chemical treatment is present on the fabric in an amount from 1 weight percent to 20 weight percent and the chemical treatment consists of one or more of the group consisting of polyamidoamine, polyamine, 4,4'-methylenebis-(cyclohexylamine), polyoxypropylene diamine, triethyleneglycol diamine, trimethylopropane-polyoxypropylene triamine, bis(2-aminopropyl)ether, aminopropylvinyl ether, and polybutadiene diamine; and a thermoplastic matrix material, wherein the sizing composition is not compatible with the thermoplastic matrix material.

9. The reinforced composite of claim 8, wherein the sizing composition includes a film former and a coupling agent.

* * * * *